United States Patent [19]

Lemme

[11] Patent Number: 4,567,549
[45] Date of Patent: Jan. 28, 1986

[54] AUTOMATIC TAKEUP AND OVERLOAD PROTECTION DEVICE FOR SHAPE MEMORY METAL ACTUATOR

[75] Inventor: Charles D. Lemme, Tucson, Ariz.

[73] Assignee: Blazer International Corp., Franklin Park, Ill.

[21] Appl. No.: 703,895

[22] Filed: Feb. 21, 1985

[51] Int. Cl.⁴ .......................... F03G 7/06; H01H 61/04
[52] U.S. Cl. .................................... 362/279; 362/325; 337/140; 60/527
[58] Field of Search .................. 337/140; 60/527, 528, 60/529; 362/279, 325, 321, 274, 277

[56] References Cited

U.S. PATENT DOCUMENTS

| | | | |
|---|---|---|---|
| 1,591,754 | 7/1926 | Gates | 362/279 |
| 2,846,543 | 8/1956 | Sivacek . | |
| 3,922,591 | 11/1975 | Olsen . | |
| 4,246,754 | 1/1981 | Wayman . | |
| 4,275,561 | 6/1981 | Wang . | |
| 4,305,250 | 12/1981 | Cory . | |
| 4,490,975 | 1/1985 | Yaeger et al. | 337/140 |
| 4,524,343 | 6/1985 | Morgan et al. | 337/140 |

FOREIGN PATENT DOCUMENTS

| | | | |
|---|---|---|---|
| 749818 | 1/1967 | Canada | 362/419 |
| 637132 | 4/1928 | France | 362/279 |

Primary Examiner—Craig R. Feinberg
Assistant Examiner—David A. Okonsky
Attorney, Agent, or Firm—Willian, Brinks, Olds, Hofer, Gilson & Lione Ltd.

[57] ABSTRACT

A device to provide overload protection for a shape memory metal (SMM) wire of an SMM-type actuator and to automatically compensate for cyclic creep and maintain the tension of the SMM wire. During normal operation, a restraining drum, in cooperation with a biasing spring, maintains the position of one end of the SMM wire so that the other end of the SMM wire can move an actuator. Under excessive loads, the restraining drum permits the first end of the SMM wire to move, thereby reducing the tension and preventing damage to the SMM actuator. When the excessive load is removed, the restraining drum permits the first end of the SMM wire to move under the influence of the biasing spring to its original position. By permitting the first end of the SMM wire to move in dependence upon the tension on the SMM wire, the device automatically takes up any slack caused by cyclic creep and maintains proper tension of the SMM wire.

10 Claims, 10 Drawing Figures

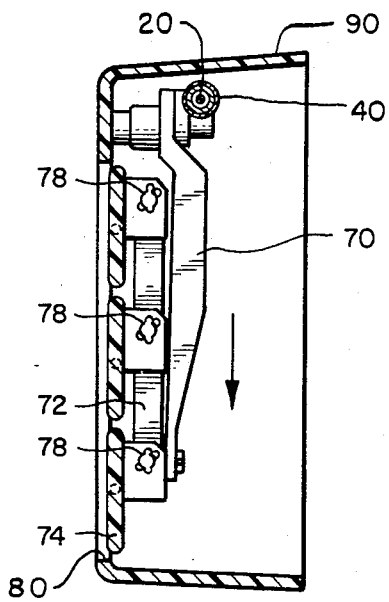
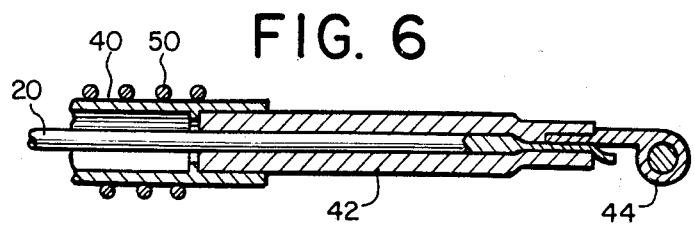
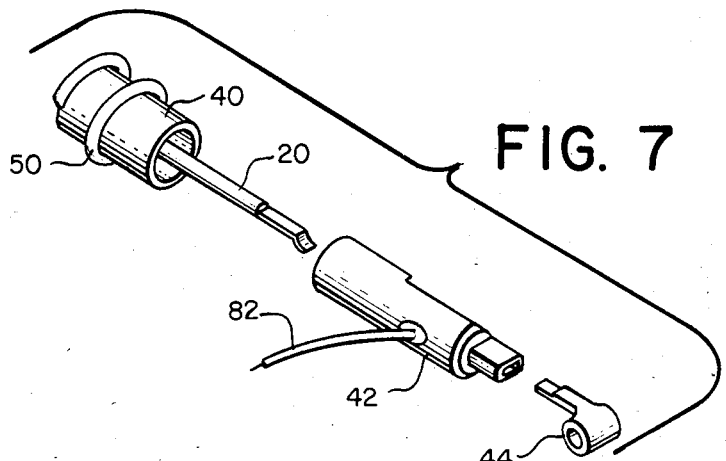
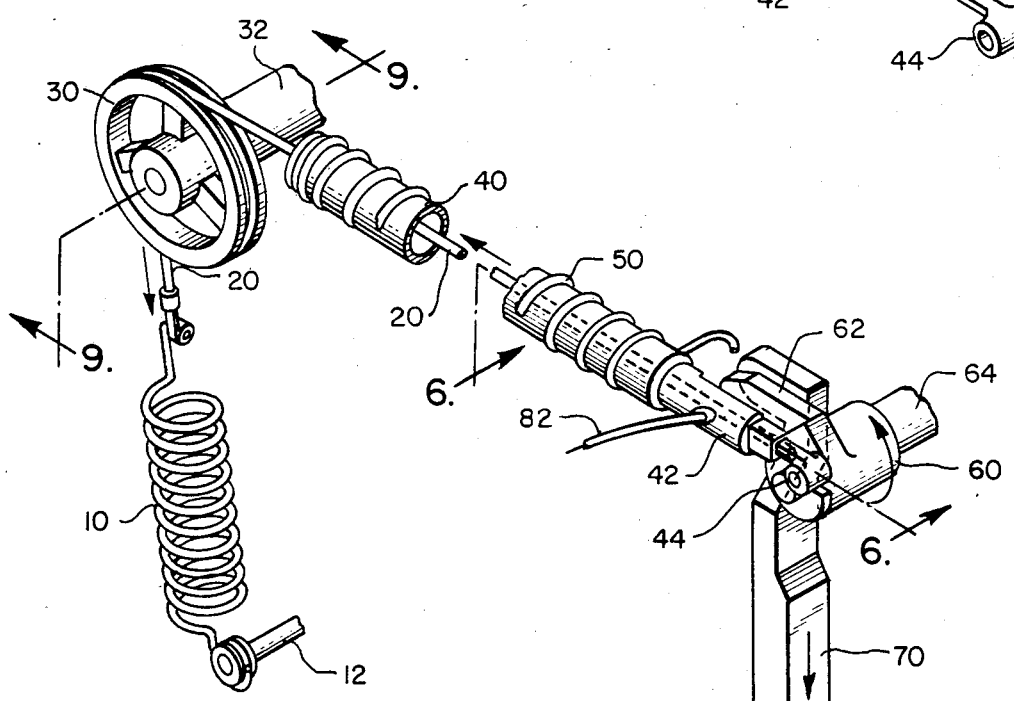

AUTOMATIC TAKEUP AND OVERLOAD PROTECTION DEVICE FOR SHAPE MEMORY METAL ACTUATOR

BACKGROUND OF THE INVENTION

This invention relates to an automatic takeup and overload protection device for shape memory metal actuators.

Shape memory metal actuators are comprised of materials characterized by their ability to deform in shape at one temperature and then revert to their original shape when the original temperature is restored. Shape memory metal (SMM) actuators utilize these materials to mechanically operate a mechanism. Typically the SMM element is in the form of a wire, ribbon, or spring and is composed of a material such as Nitinol which contracts upon heating and returns to its original length upon cooling. Because the SMM element is of finite strength, such actuators may require some form of overload protection to prevent excessive stresses in the SMM element.

In the past, such overload protection has been provided by a biasing element, typically a coil or leaf spring, which is mechanically connected in series to one end of the SMM element. The spring constant of the overload protection spring is selected such that the force required to expand or compress the spring is greater than the force required to operate the actuator. Therefore, the overload spring is operative only when the load on the SMM element exceeds the normal operating range of the actuator.

A disadvantage of using SMM material in actuators is that the SMM element tends to distort in the direction of the load as the actuator is cycled, a phenomenon commonly known as cyclic creep. Cyclic creep often results in an extra length in the SMM element, both when the element is hot and when it is cold. Upon heating, the SMM element must take up this slack before the element can perform its function of moving the attached load. When the SMM element becomes so long that it can no longer move the load through its full excursion, the SMM actuator must be adjusted or replaced.

It is an object of this invention to provide an overload protector for the SMM element which simultaneously compensates for any increase in length of the SMM element caused by cyclic creep.

SUMMARY OF THE INVENTION

According to this invention, an SMM actuator is provided which comprises a biasing element, a linkage element comprising at least one section of shape memory metal material, and a restraining element in physical contact with a linkage element. A first end of the linkage element is connected to the biasing element, and the second end of the linkage element is connected to an actuator mechanism. The actuator mechanism and the restraining element are positioned such that the section of SMM material is located between the restraining element and the actuator mechanism.

The restraining element cooperates with the linkage element to control the movement of the linkage element by means of frictional forces generated from the physical contact between the restraining element and the linkage element. These frictional forces are dependent upon both the area of contact and the tension in the linkage element created by the biasing element and by the actuator mechanism. Preferably, these frictional forces are selected to achieve the following results.

In normal operation the force necessary to operate the actuator mechanism is insufficient to overcome the frictional force produced by the restraining element. Therefore, as the SMM section changes shape under temperature change, the first end of the linkage element is immobilized by the restraining element, forcing the second end to move the actuator mechanism.

If the second end of the linkage element is prevented from moving, as when the actuator mechanism is blocked, the excessive force generated by the heated SMM material is sufficient to overcome the frictional force of the restraining element. The linkage element is thereby permitted to slip against the restraining element, and the linkage element is protected from excessive stresses. When the excessive force ceases, as when the actuator mechanism is released, the frictional force of the restraining element, which is a function of the tension in the linkage element, decreases. The force applied by the biasing element is then sufficient to move the linkage element in the direction of its original operative position and tension.

Prior art problems related to cyclic creep are overcome by the present invention in an analogous manner. As the length of the SMM section changes due to cyclic creep, the tension in the linkage element between the actuator mechanism and the restraining element decreases during certain parts of the actuator cycle. The result is a decrease in the friction generated by the restraining element, which allows the biasing element to take up slack caused by the change in length of the SMM section.

An advantage of the preferred embodiment described below is that it automatically takes up any slack in the SMM section caused by cyclic creep while simultaneously protecting the linkage element from overloading forces. Maintenance of the SMM actuator is therefore reduced and its useful life is extended. A further advantage of this embodiment is that the biasing element automatically adjusts for manufacturing and assembly tolerances in the dimensions of various components.

The invention itself, together with further objects and attendant advantages, will best be understood by reference to the following detailed description, taken in conjunction with the accompanying drawings.

BRIEF DESCRIPTION OF THE DRAWINGS

FIG. 4 is a cross-sectional view taken along line 4—4 of FIG. 3.

FIG. 5 is a perspective view of the SMM actuator mechanism included in the lamp of FIGS. 1-4.

FIG. 6 is a fragmentary cross-sectional view taken along line 6—6 of FIG. 5.

FIG. 7 is an exploded perspective view of a part of the SMM actuator mechanism of FIGS. 5-6.

DETAILED DESCRIPTION OF THE PRESENTLY PREFERRED EMBODIMENTS

Figure 1:
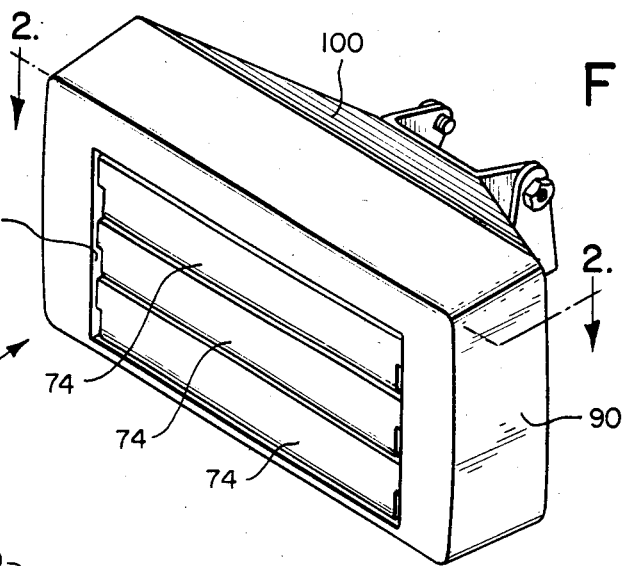
FIG. 1 is a perspective view of a louvered lamp assembly which incorporates a first preferred embodiment of the SMM actuator mechanism of this invention.

Turning now to the drawings, the preferred embodiment of the present invention is shown in FIGS. 1–9a as installed in a louvered lamp assembly 110. The lamp assembly is shown for illustrative purposes only, and the actuator of this invention can readily be adapted for use in a wide variety of other applications.

FIGS. 1–4 show various views of the lamp assembly 110, which includes a lamp 100 mounted within an exterior housing 90 which defines a light opening 80. A plurality of louvers 74 extend across the light opening 80. The louvers 74 are pivotally mounted to the housing 90 by pivot mounts 76. The louvers 74 are also pivotally coupled to a crossbar 72 by shafts 78 such that vertical movement of the crossbar 72 causes the louvers 74 to rotate about the pivot mounts 76. The crossbar 72 is fastened to a strut 70 such that movement of the strut 70 operates the plurality of louvers 74 in unison. Stops (not shown) limit the travel of the louvers 74.

Figure 3:
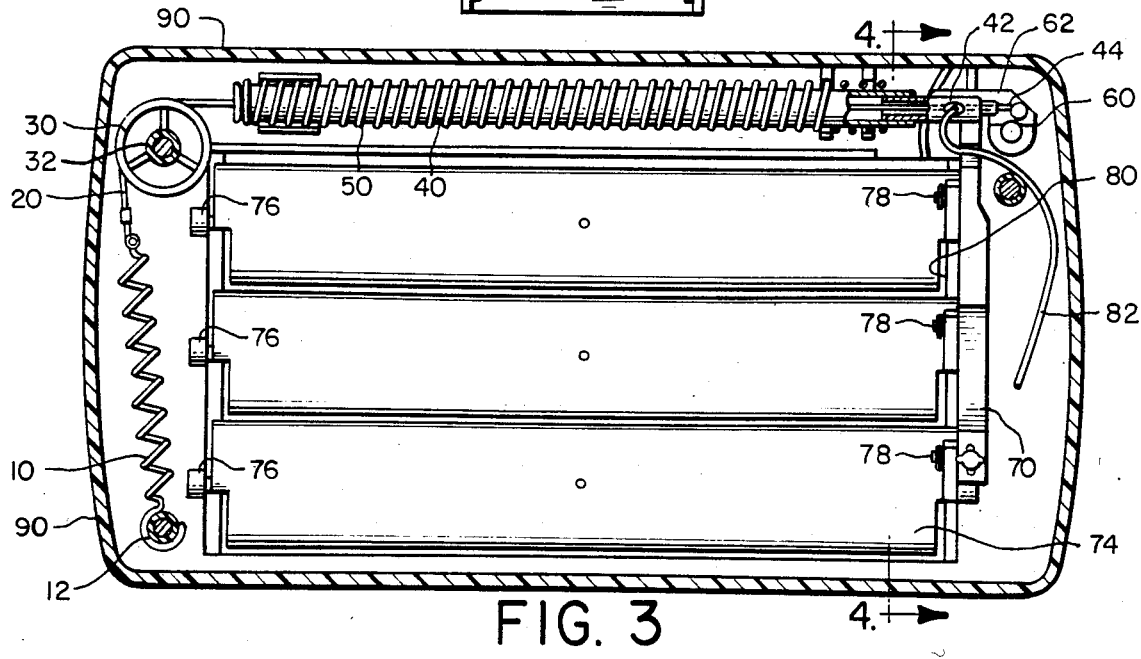
FIG. 3 is a cross-sectional view taken along line 3—3 of FIG. 2.
Figure 8:
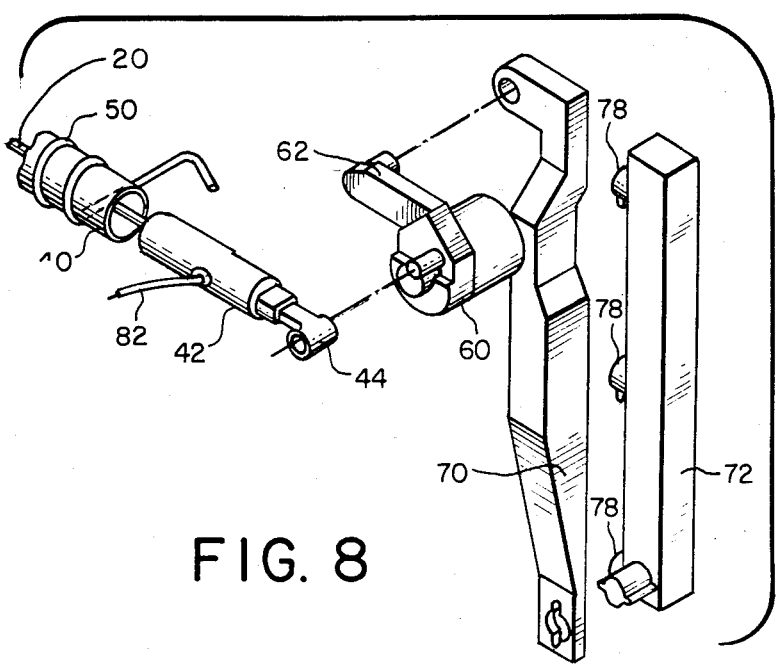
FIG. 8 is an exploded perspective view showing details of installation of the actuator of FIGS. 5-7 in the lamp of FIGS. 1-4.

When the strut 70 and crossbar 72 are in the position shown in FIGS. 3–4, the louvers 74 are oriented to substantially block the light opening 80 and thereby to protect the lamp 100 from stones and the like. As the strut 70 and crossbar 72 travel in the direction of the arrow in FIG. 4, the louvers rotate 90 degrees with respect to the housing 90 to expose the lamp 100. This allows light generated by the lamp 100 to be projected from the housing 90 in the usual manner.

Figure 2:
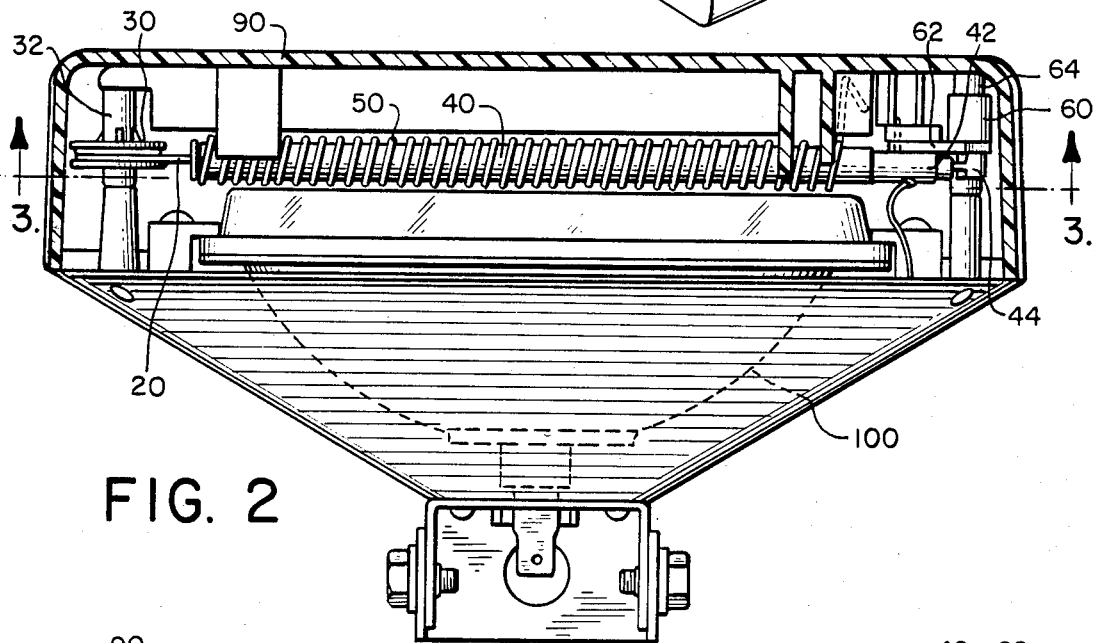
FIG. 2 is a cross-sectional view taken along line 2—2 of FIG. 1.

The louvers 74 are connected, via the crossbar 72 and the strut 70, to an actuator mechanism shown in FIGS. 2–4. On the inside face of the housing 90, a coiled spring biasing element 10 is anchored to spring post 12 which is immovably fastened to the housing 90. The second end of the biasing spring 10 is fastened to an SMM wire 20 by an eyelet which is secured to the wire 20 by means of a crimped die cast zinc sleeve. The restraining element 30, which in the present embodiment is drum-shaped and defines a grooved rim, is immovably fastened to the housing 90 by a drum post 32 defined by the housing 90. In this embodiment, the SMM wire 20 is wrapped 455 degrees (7.94 radians) about the restraining element 30.

Figure 9:
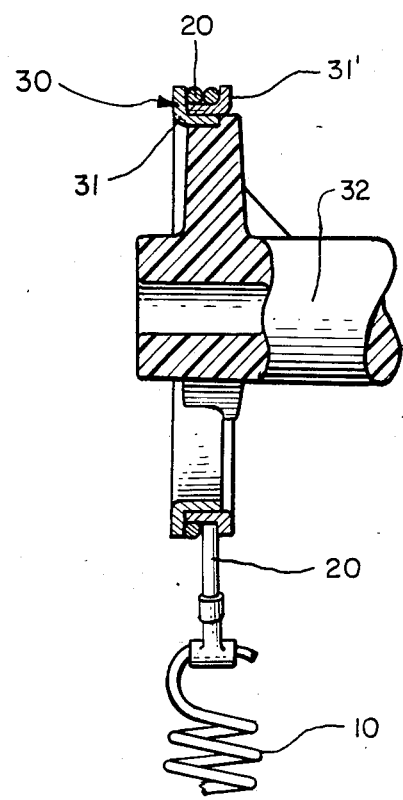
FIG. 9 is a partial sectional view taken along line 9—9 of FIG. 5.
Figure 9A:
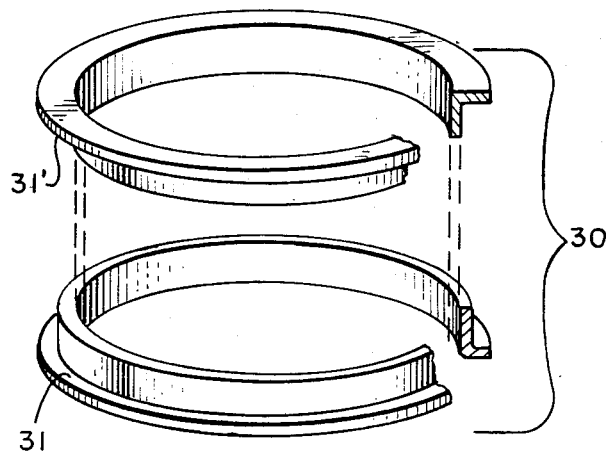
FIG. 9a is an exploded perspective view of the restraining element 30 of FIG. 9.

As shown in FIGS. 9–9a, the restraining drum 30 is assembled from two component pieces 31,31'. Although such two-piece construction may not provide a wire guide as smooth as that of one-piece construction, the two-piece drum is easier to manufacture and provides adequate restraining capabilities. Alternate embodiments may use a one-piece drum.

Referring now to FIGS. 5–8, the SMM wire 20 continues from the restraining drum 30 through a first end of a tubular return spring support 40 and is secured to a connector 42. The connector 42 defines a pivot arm 44 opposite the spring support 40, and an electrical lead 82 supplies an electric current to the connector 42 for the direct resistive heating of the SMM wire 20. The return path for the electric current is provided through the spring 10.

A swivel crank 60 is rotatably mounted to the housing 90 by a crank post 64. The drum post 32 and the swivel crank post 64 are separated by a sufficient distance to accommodate a length of SMM wire 20 capable of producing the desired length change. The pivot arm 44 is pivotally mounted off center of the swivel crank 60 such that a linear movement of the pivot arm 44 produces a rotational movement of the swivel crank 60. A swivel crank arm 62 of the swivel crank 60 is pivotally mounted to the strut 70 such that rotational movement of the swivel crank arm 622 produces linear movement of the strut 70. Movement of the pivot arm 44 parallel to the louvers 74 is therefore translated into movement of the strut 70 transverse to the louvers 74.

A coil return spring 50 is located concentrically about the spring support 40. One end of the return spring 50 is fastened to a first end of the spring support 40 near the restraining element 30, and the other end of the return spring 50 is fastened to the housing 90. The return spring 50 biases the pivot arm 44, swivel crank 60 and strut 70 to an initial closed position in which the louvers 74 cover the lamp 100.

The force of the biasing spring 10 is multiplied by the friction generated by the restraining drum 30 when a sufficient tension T is applied to the second end of the SMM wire 20. The multiplying factor is dependent on the coefficient of friction between the restraining drum 30 and the SMM wire 20, the angle the SMM wire 20 is wrapped around the restraining drum 30, and the ratio of the diameter of the SMM wire 20 to the diameter of the restraining drum 30. The following formula is believed to approximate this multiplying factor:

$$F = T/(T_o - T_i) \cdot \exp(mA);$$

where:
F = multiplying factor;
m = coefficient of friction;
A = angle of wrap in radians;
T = tension of the first end of SMM wire 20;
$T_o$ = tension on the second end of SMM wire 20;
$T_i$ = initial tension on the second end of SMM wire 20 below which the bending of the wire 20 keeps the wire 20 off of the restraining drum 30.

The formula assumes that the tension in the SMM wire 20 decreases monotonically. However, the tension actually reaches a minimum somewhere between the two ends because of the bending stresses in the SMM wire 20. This introduces some errors in predicting the exact behavior of the restraining device, but the formula provides a guideline for initial design. Actual testing is required to refine the design. The coefficient of friction for the embodiment of FIGS. 1–9a has been experimentally determined, using the above formula, to be approximately 0.11.

In the presently preferred embodiment, the biasing spring 10 has an installed force of 280 grams and a rate of 8.6 gm/mm. Also, the SMM wire 20 is composed of 0.5 mm diameter Nitinol wire, 110 mm long and capable of decreasing its length by 2% when heated. A suitable material may be obtained from Furukawa Specialty Metals Division, Tokyo, Japan. Preferably this material is a 50-50 atomic ratio of Nickel and Titanium, having an Austinitic finish transition temperature of about 108° C. In this preferred embodiment, this material is heat treated by raising its temperature to about 500° C. and then oven cooling it. It is then stressed in tension to 20,000 psi, heated to about 200° C. and cooled to about 30° C. These last heating and cooling steps are preferably repeated a total of four times while the material is under tension stress to properly condition the material. The return spring 50 used in the presently preferred embodiment has an installed force of 350 grams and a rate of about 8 gm/mm. In other embodiments, a buckled column spring may be used for the return spring 50. The restraining drum 30 is comprised of 304 stainless steel with a #2B surface finish and has an outside diameter of 14.4 mm with a 1.1 mm wide groove. These parameters result in slippage between the SMM wire 20 and the drum when the tension in the SMM wire 20 exceeds about 650 grams (to provide overload protection) and when the tension in the SMM wire 20 falls below about 80 grams (to take up excess slack and compensate for cyclic creep).

When the lamp is off, no electric current is applied to the SMM wire 20 and its temperature is ambient. The return spring 50 biasing the pivot arm 44, swivel crank 60, strut 70 and louvers 74 to the closed position. The biasing spring 10, in cooperation with the restraining drum 30, maintains the proper tension in the SMM wire 20. This tension is sufficient to eliminate any slack in the SMM wire 20.

When the lamp is turned on, electric current flows through the electrical lead 82, the SMM wire 20, and the biasing spring 10. Due to the resistivity of the SMM wire 20, the passage of electric current through the SMM wire 20 causes the temperature of the SMM wire 20 to increase. As the temperature increases, the length of the SMM wire 20 decreases. The decreasing length of the SMM wire 20 causes an increase in tension of the SMM wire 20 between the restraining drum 30 and the pivot arm 44. The frictional force between the stationary restraining drum 30 and the SMM wire 20 correspondingly increases. The combination of the forces produced by the biasing spring 10 and the restraining drum 30 is greater than the force necessary to overcome the return spring 50. For this reason, the restraining drum 30 and the biasing spring 10 prevent the first end of the SMM wire 20 from moving. With the first end of the SMM wire 20 immobilized, the second end is able to move the pivot arm 44, swivel crank 60, and strut 70 to open the louvers 74.

If the louvers 74 are prevented from opening or are forced closed after opening, the tension in the SMM wire 20 between the restraining element 30 and the pivot arm 44 becomes excessive (greater than 650 grams in this embodiment). This excessive force is sufficient to overcome the frictional force of the restraining drum 30 and the biasing force of spring 10. Under these conditions, the first end of the SMM wire 20 slips about the restraining drum 30 and extends the biasing spring 10. This slipping reduces the tension in the SMM wire 20 and prevents damage to the SMM wire 20 or to the louver operating mechanism 44,60,70.

When the excessive force is removed, the tension in the SMM wire 20 between the restraining drum 30 and the pivot arm 44 is reduced. Correspondingly, the frictional force of the restraining drum 30 is reduced. The extended biasing spring 10 now provides sufficient force to overcome the frictional force of the drum 30 and to pull the SMM wire 20 back towards its original operative position and tension.

When the lamp is turned off, the electric current in the wire 20 ceases. As the SMM wire 20 cools, it original length is restored. The first end of the SMM wire 20 is held stationary by the friction of the restraining drum 30 and the biasing spring 10. The return spring 50 is then able to position the pivot arm 44, swivel crank 60, strut 70, and louvers 74 to their closed position.

Any slack in the SMM wire 20, caused by cyclic creep, is taken up by the biasing spring 10 in an analogous manner. As the length of the SMM wire 20 increases, the tension in the SMM wire 20 decreases, which causes a corresponding decrease in the friction generated by the restraining drum 30. The force of the biasing spring 10 is then sufficient to pull the SMM wire 20 about the restraining drum 30 until the tension in the SMM wire 20 between the restraining drum 30 and the pivot arm 44 is again at an operative level (80 grams in this embodiment).

It should be understood that materials and details of construction different from those used in the preferred embodiment may be selected to adapt the actuator of this invention to specific applications. For example, the length of the SMM wire 20 may be reduced to the minimum length necessary to produce the desired operating range and a section of less expensive linkage wire may be attached to the SMM wire 20 to obtain the overall desired length. Furthermore, the amount the SMM wire 20 is wrapped about the restraining drum 30 can be adjusted to accommodate the particular application, and an SMM coiled spring or bent beam may be substituted for the wire 20.

The foregoing detailed description has been given for illustrative purposes only, and it should be clearly understood that use of the actuator of this invention is not limited to use with louvered lamp assemblies. Numerous other applications will be apparent to those skilled in the art.

A wide range of changes and modifications can be made to the preferred embodiment described above. It should be understood that it is the following claims, including all equivalents, which are intended to define the scope of this invention.

I claim:

1. An automatic takeup and overload protection device for a shape memory metal actuator for the type comprising an actuator mechanism movable between first and second positions, said device comprising:
    a biasing element;
    a linkage element defining first and second ends and comprising at least one section of shape memory metal material; said first end fastened to said biasing element and said second end fastened to said actuator mechanism; said section of shape memory metal material operating to move said actuator mechanism to said second position when said shape memory metal material is placed at a selected temperature; and
    a restraining element comprising a friction generating surface in physical contact with said linkage element;
    said surface cooperating with said linkage element to generate frictional forces of sufficient magnitude to prevent said first end of said linkage element from moving with respect to said surface during movement of said actuator mechanism to said second position and to protect said linkage element from excessive tension by allowing said first end of said linkage element to move with respect to said surface when excessive forces are applied to said linkage element by said actuator mechanism;
    said surface further cooperating with said linkage element to allow said biasing element to move said first end of said linkage element with respect to said surface to substantially maintain a minimum tension of said linkage element between said surface and said actuator mechanism.

2. The device of claim 1 wherein said biasing element comprises a coil spring.

3. The device of claim 1 wherein said section of shape memory metal material comprising a Nitinol wire.

4. The device of claim 1 wherein said restraining element comprises a drum.

5. The device of claim 1 wherein said linkage element is wrapped about said restraining element by at least 180°.

6. An automatic takeup and overload protection device for a shape memory metal actuator of the type comprising an actuator mechanism capable of traveling between first and second positions, said device comprising:
   a biasing element;
   a restraining drum; and
   a linkage element defining a first end and a second end and comprising at least one section of shape memory metal material; said first end securely fastened to said biasing element and said second end securely fastened to said actuator mechanism; said linkage element wrapped about said restraining drum; said section of shape memory metal material operating to move said actuator mechanism to said second position when said shape memory metal material is brought to a selected temperature;
   said restraining drum cooperating with said linkage element to generate frictional forces of magnitude dependent on the tension of said linkage element;
   said biasing element, restraining drum and actuator mechanism cooperating to produce tension in said linkage element sufficient to generate frictional forces to prevent said first end of said linkage element from moving with respect to said restraining drum during normal movement of said actuator mechanism to said second position and to protect said linkage element from excessive tension by allowing said first end of said linkage element to move with respect to said restraining drum in response to excessive tension in the linkage element;
   said restraining drum further cooperating with said linkage element to allow said biasing element to move said first end of said linkage element with respect to said restraining drum to substantially maintain a minimum tension of said linkage element between said surface and said actuator mechanism.

7. The invention of claim 6 wherein said biasing element comprises a coil spring.

8. The invention of claim 6 wherein said section of shape memory metal material comprises a Nitinol wire.

9. The invention of claim 6 wherein said linkage element is wrapped about said drum by at least 180°.

10. In a louvered lamp assembly of the type comprising a plurality of louvers and an actuator mechanism capable of moving said louvers between a first position and a second position, the improvement comprising:
   a coil spring mounted to the louvered lamp assembly;
   a drum mounted to the louvered lamp assembly; and
   a length of shape memory metal material wrapped around the drum with a first end fastened to said spring and a second end fastened to said actuator mechanism; said shape memory metal material operating to move said louvers to said second position when heated;
   said drum cooperating with said shape memory metal material to generate frictional forces of sufficient magnitude to prevent sid first end of said shape memory metal material from moving with respect to said drum during normal movement of said louvers to said second position and to protect said shape memory metal material from excessive stress by allowing said first end of said shape memory metal material to move with respect to said restraining element in response to excessive tension in the shape memory metal material;
   said restraining element further cooperating with said shape memory metal material to allow said spring to move said first end of said shape memory metal material with respect to said restraining element to substantially maintain a minimum tension of said shape memory metal material between said restraining element and said actuator mechanism.

* * * * *